United States Patent

[11] 3,629,633

[72] Inventor Gerald F. O'Callaghan
 Kenosha, Wis.
[21] Appl. No. 83,826
[22] Filed Oct. 26, 1970
[45] Patented Dec. 21, 1971
[73] Assignee Eaton Yale & Towne Inc.
 Cleveland, Ohio

[54] CONTROLLED-VELOCITY DRIVE CONTROL
 20 Claims, 14 Drawing Figs.
[52] U.S. Cl. .................................................. 310/94,
 310/93, 318/317, 318/326, 318/6
[51] Int. Cl. ...................................................... H02k 49/04
[50] Field of Search ............................................ 310/94, 95;
 318/326, 6, 216, 21 T, 317

[56] References Cited
 UNITED STATES PATENTS
3,374,373 3/1968 Calvert ........................ 310/94
3,374,374 3/1968 Smith ........................... 310/94

Primary Examiner—D. X. Sliney
Attorney—Koenig, Senniger, Powers & Leavitt

ABSTRACT: A control for a controlled-velocity drive having a driven member and an electromagnetic coupling having a winding the energization of which controls the angular velocity of the driven member. A triggerable semiconductor current switching device is adapted to be connected between a source of AC power and the winding for controlling the energization thereof. Three feedback circuits provide degenerative feedback signals respectively varying according to the driven member angular velocity, the current in the winding and the rate of change of the current. Means is provided for producing a reference voltage proportional to a preselected angular velocity of the driven member. Circuitry is responsive to the reference voltage and to the three feedback signals for causing triggering of the current switching device at varying phase angles of the AC power to drive the driven member substantially at said preselected angular velocity. This circuitry is also operational for causing triggering of the switching device at a substantially constant phase angle of the AC power to cause conduction of the switching device when the AC power voltage and the voltage across the winding are inverted so that current in the winding decays rapidly when energization thereof is rapidly reduced. Various optional control functions are also provided which may be connected by jumper leads.

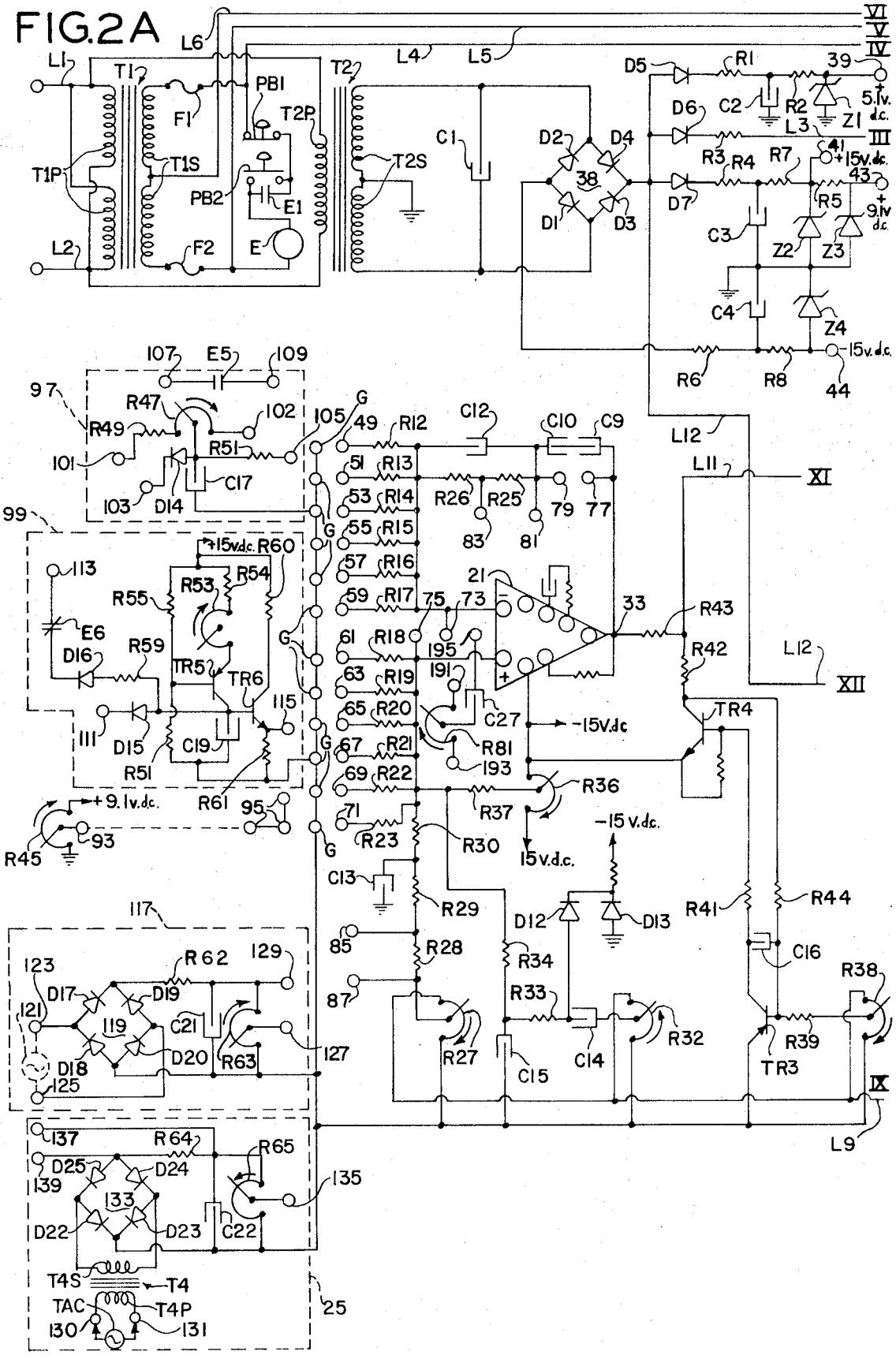

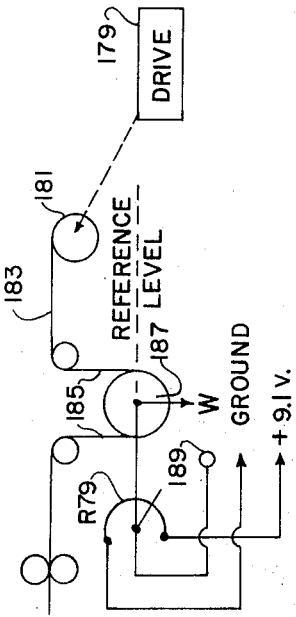
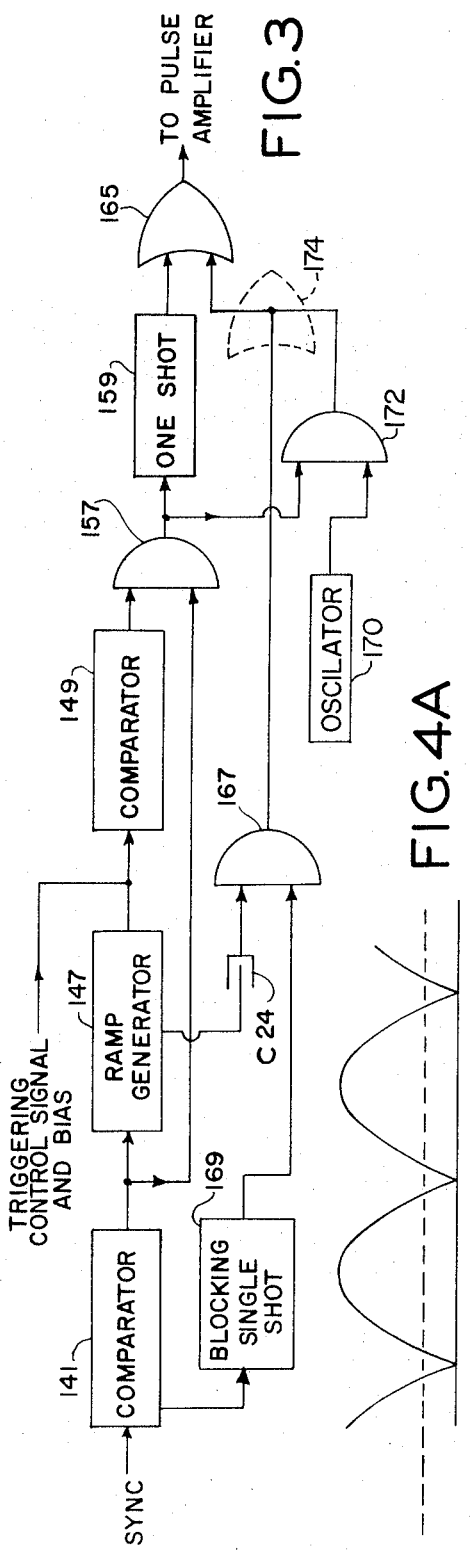
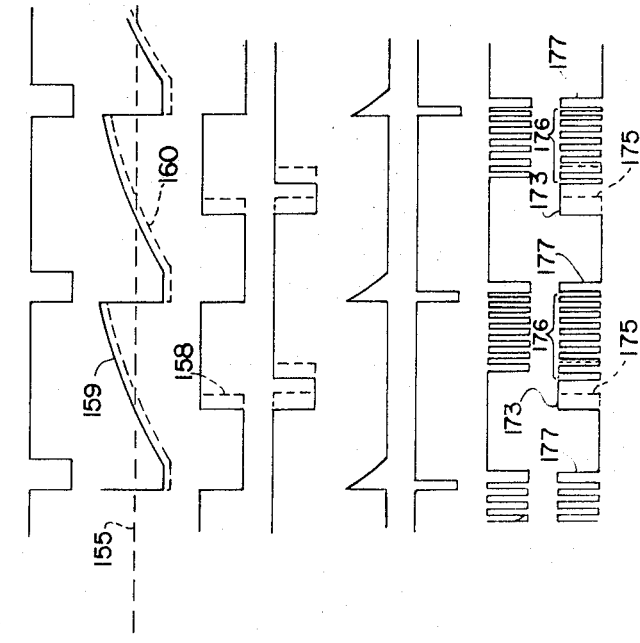

CONTROLLED-VELOCITY DRIVE CONTROL

BACKGROUND OF THE INVENTION

This invention relates to controlled-velocity drives and more particularly to a solid-state switching control for an eddy-current drive.

Controls of the present type typically heretofore have been relatively limited in flexibility. Such controls are often designed for use in only certain limited applications, with the dynamic performance of the control usually being satisfactory only for these known and well-defined applications. The dynamic performance of such controls may be seriously degraded or the control may require careful, time-consuming tailoring or circuit changes for any different or nonstandard control application. Consequently such prior art controls are not well suited to being used in a variety of different applications and thus do not permit the user to quickly modify the control for a new requirement, as is frequently desired.

SUMMARY OF THE INVENTION

Among the several objects of the invention may be noted the provision of a control for a controlled-velocity eddy-current drive; the provision of such a control which is readily adapted to be used for a wide variety of control applications and to provide high performance control under a wide range of actual operating conditions; the provision of such a control is highly modular in design so as to permit use in said variety of control applications through use of simple jumper or module connections; the provision of such a control having excellent dynamic response and highly accurate speed control over a wide range of speeds; the provision of such a control including a selectively operable provision for achieving a very high long term accuracy of speed control; the provision of such a control for controlling the energization of an eddy-current coupling winding including means for permitting energy inductively stored in the winding to be rapidly "pumped" back into the AC supply thus providing "inversion" of the power flow thereby to achieve improved dynamic response in response to changes in load or speed; the provision of such a control including means permitting "forcing" the energization of the winding to increase the rate of response thereof; the provision of such a control which is solid state and relatively simple in design, relatively inexpensive, easily and inexpensively maintained, and long-lasting and reliable in operation. Other objects and features will be in part apparent and in part pointed out hereinafter.

Generally speaking, the invention relates to a control for a controlled-velocity drive having a driven member and electromagnetic coupling having a winding, e.g., an eddy-current coupling, the energization of which winding controls the angular velocity of the driven member. The control utilizes a triggerable semiconductor current switching device, e.g., an SCR adapted to be connected between a source of AC power and the winding for controlling the energization thereof. A first feedback circuit including a tachometer generator produces a first degenerative feedback signal having an amplitude which varies as a function of the instantaneous angular velocity of the driven member. A second feedback circuit produces a second degenerative feedback signal having an amplitude which varies as a function of the current in the winding, and a third feedback circuit produces a third degenerative feedback signal having an amplitude which varies as a function of the rate of change of the current in the winding. The control further comprises means for producing a reference voltage proportional to a preselected angular velocity of the driven member. The control includes means for algebraically summing the reference voltage and the three feedback signals and for producing a triggering control signal varying as a proportional function of the algebraic sum. This last-said means includes an internal feedback circuit adapted to be connected for causing the triggering control signal to vary also as a function of the time integral of the algebraic sum whereby the angular velocity of the driven member is maintained substantially equal to the preselected angular velocity with a high order of long term accuracy. Triggering circuitry is responsive to the triggering control signal for triggering the switching device at phase angles of the AC power varying in accordance with the triggering control signal to drive the driven member substantially at the preselected angular velocity. This triggering circuitry is also operative to provide so-called inversion pulses for triggering the switching device at a substantially constant phase angle of the AC power to cause conduction of the switching device when the AC power and the voltage across the winding are inverted whereby current in the winding rapidly decays upon rapid reduction of energization thereof. Circuitry interconnected with the first feedback circuit and with the triggering circuitry operates to limit the variable phase angle of triggering if the winding current incipiently exceeds a preset value and thus prevents the winding current from substantially exceeding this preset value. This feature permits so-called forcing of the winding by energization with higher-than-rated voltage, thus providing quicker response.

BRIEF DESCRIPTION OF THE DRAWINGS

FIGS. 2A and 2B together constitute a schematic circuit diagram of a control of the invention, corresponding interconnections between the two portions of the circuit being identified by Roman numerals;

FIG. 3 is a block diagram of certain pulse generator circuitry of the control;

FIGS. 4A–4J represent various waveforms useful in the explanation of the operation of the FIG. 2 control; and FIG. 5 is a diagram illustrating an application of the FIG. 2 control for controlling a payoff or takeup drive.

Corresponding reference characters indicate corresponding parts throughout the several views of the drawings.

DESCRIPTION OF THE PREFERRED EMBODIMENT

Figure 1:
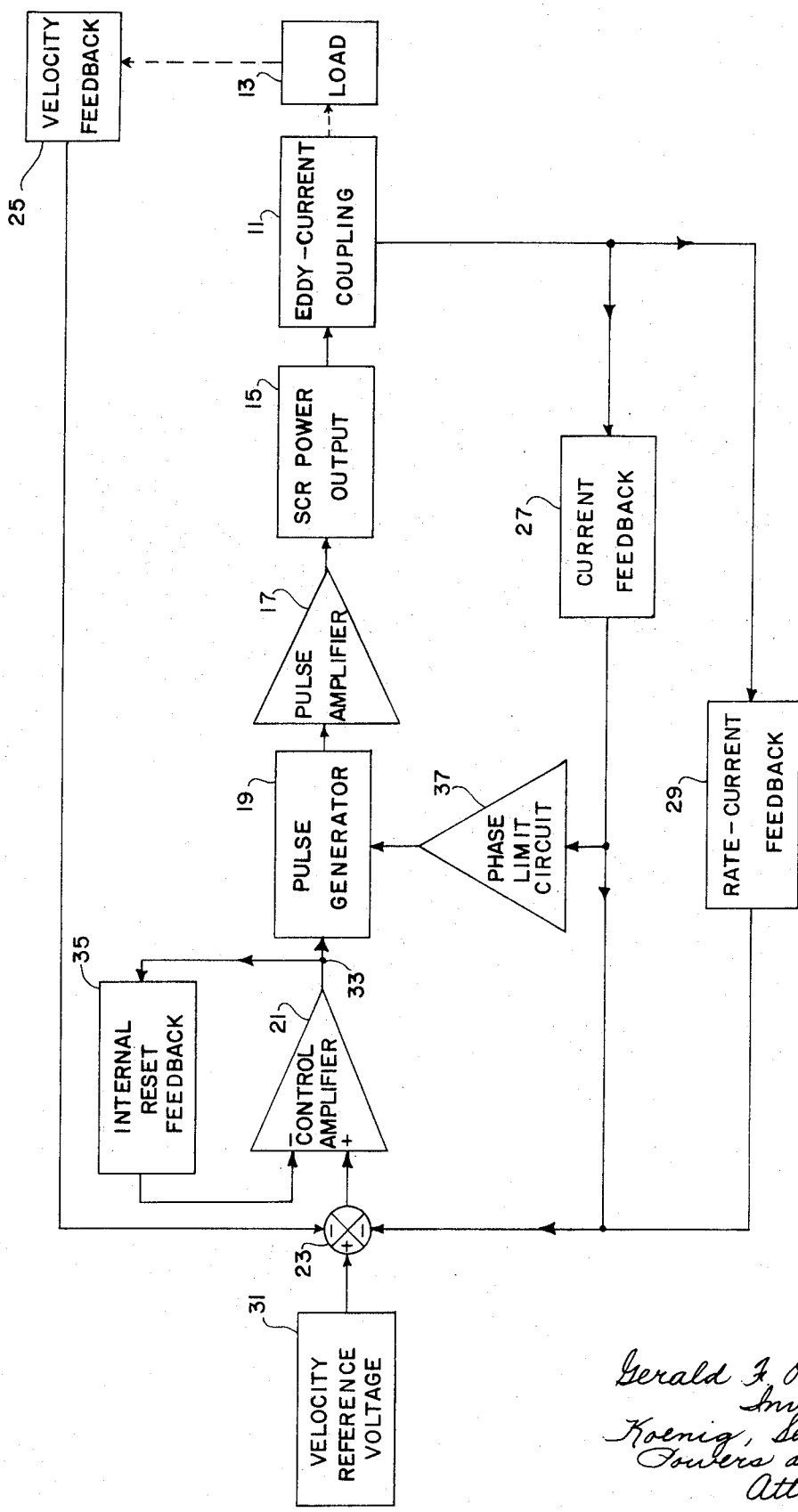
FIG. 1 is a block diagram illustrating functionally the major components of an eddy-current drive and control of this invention and their interconnection.

Referring now to the drawings, and more particularly to FIG. 1, the present invention comprises a switching control for a controlled-velocity drive having an electromagnetic coupling, e.g., an eddy-current coupling indicated by the block 11, having a winding the energization of which controls the angular velocity of a driven member or load 13. More specifically, the winding energization controls the torque applied to the load, and thus the angular acceleration of the driven member, the torque being modulated by the control to attain a desired angular velocity. The winding may also be the field winding of a motor. In an eddy-current clutch as shown, the winding functions to couple power from a rotating driving member (not shown) to the load 13. Energization of the winding of the eddy-current coupling is controlled by SCR power output circuitry indicated at 15 including a plurality of SCR's (silicon controlled rectifiers) which are adapted to be connected between a source of AC power, i.e., conventional AC power lines, and the winding of eddy-current coupling 11.

As those skilled in the art are aware, the SCR's are triggerable semiconductor current switching devices which, when triggered, are conductive on alternate half-cycles of the AC waveform applied across their cathode and anode terminals, the shifting of the phase of triggering of the SCR's causing variation of the average power supplied to the winding of coupling 11 thereby to vary the speed of load 13. Triggering of the SCR's is caused by pulses supplied by a pulse amplifier 17 and which are generated by a pulse generator 19. Triggering of the SCR's occurs at phase angles of the AC power which vary in accordance with a triggering control signal delivered to pulse generator 19 by a control amplifier 21. The latter is shown to comprise a differential amplifier having inverting and noninverting input terminals designated with minus and plus signs, respectively.

Various feedback circuits are employed in the control which are representatively interconnected with control amplifier 21 by means of a summing junction 23. A first feedback circuit providing velocity feedback is indicated by the block 25 and includes a tachometer generator (not shown) which is driven by the driven member or load 13 for producing a first degenerative feedback signal having an amplitude which varies as a function of the instantaneous angular velocity of the driven member. The degenerative character of this feedback signal is indicated by the minus sign at summing junction 23. A second feedback circuit providing current feedback is indicated by the block 27. This feedback circuit produces a winding current feedback signal which is degenerative in character and has an amplitude which varies as a function of the current in the winding of coupling 11. The block designated 29 represents a third feedback circuit producing a third degenerative feedback signal having an amplitude which varies as a function of the rate of change of the current in the winding of coupling 11, i.e., which is proportional to load acceleration.

Means for producing a reference voltage proportional to a preselected angular velocity of the driven member is indicated by the block designated 31. This reference voltage is supplied to summing junction 23 in a regenerative sense represented by the plus sign at the summing junction. Summing junction 23 and control amplifier 21 together act to algebraically sum this reference voltage and the three feedback signals for producing a triggering control signal at point 33, the output of control amplifier 21, which signal varies as a proportional function of this algebraic sum. The pulse generator 19 and pulse amplifier 17 then act as a triggering means responsive to this triggering control signal for triggering the SCR's at phase angles of the AC power varying in accordance with the triggering control signal to drive load 13 substantially at the preselected angular velocity.

The control includes a so-called internal reset feedback circuit indicated at 35 which is shown connected between point 33 and the inverting input terminal of control amplifier 21 to provide degenerative, stabilizing feedback. Circuit 35 is adapted to be selectively connected for causing the triggering control signal at point 33 to vary also as a function of the time integral of the algebraic sum of the reference voltage and the three feedback signals so that the angular velocity of load 13 is maintained substantially equal to the preselected angular velocity with a very high order of accuracy.

Another feature of the control illustrated by FIG. 1 is represented by an amplifier-type phase limit circuit indicated at 37 which is interconnected with the current feedback circuit 27 and pulse generator 19 for the purpose of limiting the varying phase angle of triggering of the SCR's when the current in the winding of coupling 11 exceeds a preset value. Operation of phase limit circuit 37 thus acts to substantially prevent the winding current from exceeding this preset value.

POWER SUPPLY AND START-STOP CIRCUITRY

Figure 2B:
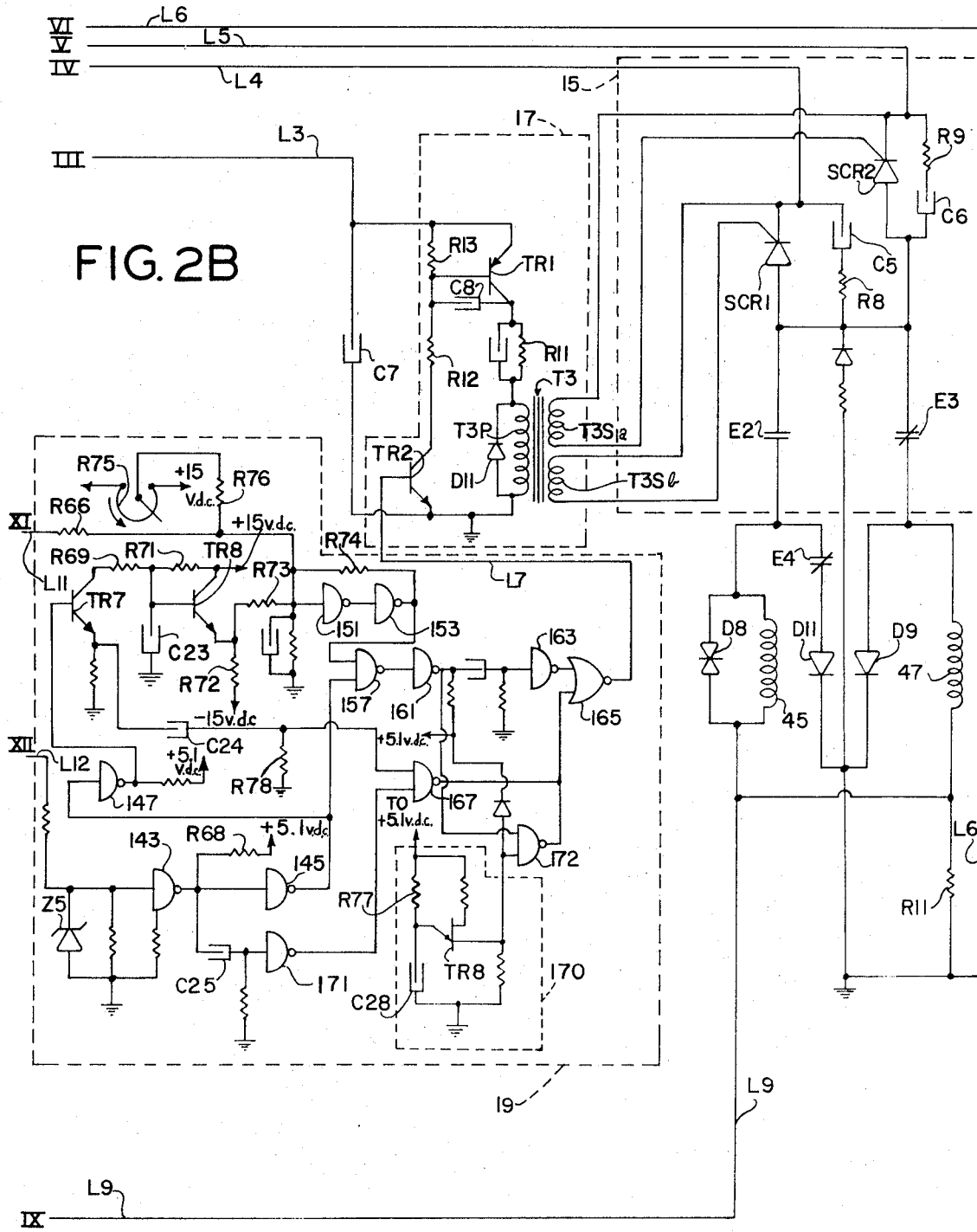

Referring now to FIGS. 2A and 2B, single-phase AC power, e.g., at 230 v. AC is supplied by an ampul of leads L1 and L2 across each of a pair of primary windings, each designated T1P, of a transformer T1. The secondary winding T1S of transformer T1 is center-tapped to provide a suitably stepped-down voltage such as 115 v. AC through respective fuses F1 and F2 on each side of this winding. A connection is made from fuse F1 through a normally closed pushbutton switch PB1, a normally open switch PB2, the winding of a relay E, and then to fuse E2. Relay E controls a set of normally open contacts E1 which are connected across pushbutton switch PB2, and also controls other contacts explained hereinbelow.

The 230 v. AC line voltage is also supplied across the primary winding T2P of a transformer T2 having a secondary winding T2S including a grounded center-tap and which provides a stepped-down voltage on either side of the center-tap of 24 v. AC for example. The entire 48 v. AC voltage across secondary winding T2S is applied across a filtering capacitor C1 which tends to damp out any "noise" carried on the AC powerline. Connected across capacitor C1 is a full-wave rectifier bridge 38 including diodes D1–D4.

One output terminal of bridge 38 supplies the rectified full-wave output of the bridge to a plurality of Zener diode regulating circuits. The first one of these circuits includes an isolation diode D5, a resistor R1, and a filtering capacitor C2. The voltage across capacitor C2 is supplied through a resistor R2 and a Zener diode Z1 connected between the other side of resistor R2 and ground to provide a voltage at a terminal 39 of a level suitable for powering the integrated circuits utilized in the control, e.g., 5.1 v. DC. Another regulating circuit includes an isolation diode D6 and a resistor R3 to supply the full rectified peak value output voltage of the rectifier bridge to certain pulse amplifier circuitry which is explained hereinafter via a lead L3. Another regulating circuit includes a diode D7, a resistor R4 and a filtering capacitory C3, one side of which is grounded. A circuit including a resistor R7 and a Zener diode Z2 is connected across capacitor C3 and supplies a regulated voltage of positive 15 v. DC at a terminal 41 to provide DC power for certain other portions of the control circuitry. A resistor R5 and a Zener diode Z3 are connected across Zener diode Z2 to provide a somewhat lower regulated voltage, e.g., positive 9.1 v. DC at a terminal 43 for still other portions of the circuitry.

Another regulating circuit includes a resistor R6 and a filter capacitor C4 which are connected to the opposite output terminal of the full-wave rectifier bridge. A resistor R8 layer a further Zener diode Z4 are connected across capacitor C4 to provide a negative regulated voltage of 15 v. DC, for example, at a terminal 44.

SCR POWER OUTPUT AND PULSE AMPLIFIER

Referring to FIG. 2B, the power output circuitry 15 is shown to include a pair of SCR's designated SCR1 and SCR2. So-called snubber or "$dv/dt$" suppression circuits include respective resistors R8 and R9 and capacitors C5 and C6 connected in series across the anode and cathode terminals of these SCR's. The useful of the SCR's are each connected through fuses F1 and F2 to opposite sides of secondary winding T1S of transformer T1 through respective leads L4 and L5. The anodes of these SCR'crystal, are connected in common to lateral side of a set of normally open contacts E2 of relay E. When closed, contacts E2 are adapted to provide power to the clutch winding 45 of the eddy-current coupling 11. A thyristor or equivalent suppressor diode D8 is conventionally connected across clutch coil 45.

The winding of an eddy-current brake is also illustrated and is designated 47. As is understood by those skilled in the art, energization of the clutch is such as to control the speed of the load 13 to maintain a preselected velocity, while energization of brake winding 47 is utilized to bring the load to a stop. The brake is adapted to be energized by means of a set of normally closed contacts E3 of relay E. A diode D9 is connected from the top side of brake winding 47 to ground. A similar diode D11 is provided for clutch winding 45 and is connected to the top side of winding 45 through a set of normally closed contacts E4 of relay E. Contacts E4 are adapted to close just prior to the opening of contacts E2 and the closing of contacts E3 upon deenergization of the winding of relay E, for a purpose explained later. Upon deenergization of clutch winding 45 and brake winding 47, these respective diodes D11 and D9 act to shunt current in these windings to ground, i.e., they permit current flow through the inductive load to dissipate the so-called $\frac{1}{2}LI^2$ energy inductively stored therein. The lower side of each of windings 45 and 47 is connected in common through a resistor R11 to ground. The grounded lower side of resistor R11 is also connected via a lead L6 to the center-tap of transformer winding T2S. Thus when triggered, SCR1 and SCR2 cause energization of clutch winding 45 or brake winding 47 according to which of contacts E2 and E3 is closed.

Triggering of the SCR's is caused by pulses delivered from pulse amplifier circuit 17. The latter includes a transformer T3 having a pair of secondary windings T3Sa and T3Sb each respectively connected across the gate or triggering terminal and cathode of SCR1 and SCR2, respectively. One side of the primary winding T3P of this transformer is grounded and the other side is connected through a resistor R11 to the collector of a transistor TR1. A so-called half-back or voltage suppression diode D11 is connected across primary winding T3P. The emitter of transistor TR1 is connected to the power supply circuitry via lead L3. The conduction of transistor TR1 is controlled by a transistor TR2 whose collector and emitter are connected in a circuit including resistors R12 and R13 with the base terminal of transistor TR1. A filter capacitor C7 is connected between lead L3 and ground. Pulses are supplied to the base of transistor TR2 from a lead L7 from the pulse generator circuitry 19 explained hereinbelow. It may be noted that a capacitor C8 between the base and collector of TR1 provides a Miller-effect reduction of frequency response to provide noise immunity.

CONTROL AMPLIFIER

Control amplifier 21, described previously as comprising a differential amplifier, is preferably of the monolithic integrated circuit operational type of differential amplifier or voltage comparator which is widely commercially available. Its output varies as a function of the algebraic sum of the voltages applied to its inverting and noninverting inputs. Various other terminals of amplifier 21 which are used for power supply connections or to provide internal feedback, as is conventional, will be understood by those skilled in the art.

Connections to both the inverting and noninverting input terminals of amplifier 21 may be made by jumper connections at various terminals. For example, connections to the inverting input may be made by means of connections to terminals 49–59, consecutively, through respective resistors R12–R17, consecutively, connected with each of these terminals. Resistors R12–R17 may be of different values within the range of from 25 kilohms to 100 kilohms, for example. Similarly, connections to the noninverting input terminal may be made through jumper connections at terminals 61–71 through respective resistors R18–R23, consecutively, connected with each of these latter terminals.

Various other terminals such as those shown at 73 and 75 may also be provided to facilitate connections. Preferably, these various terminals are positioned in adjacent alignment on a printed circuit board or as in a terminal block, for example. Connections to these various terminals according to the appropriate circuit module or circuit components which are to be utilized, are described hereinbelow. A plurality of grounded terminals, each designated G, are also preferably positioned on the circuit board adjacent the control amplifier input terminals (as schematically represented) to facilitate the making of connections in the use of the control. Any one of various input circuits may be connected, as described hereinbelow, with control amplifier 21, by means of the various terminals, to serve as means for producing a reference voltage proportional to a preselected velocity of load 13, with speed feedback being provided by tachometer generator or tachometer follower circuitry whose description follows.

FEEDBACK AND PHASE LIMIT

A feedback circuit for amplifier 21 is shown in FIG. 2A to include capacitors C9, C10 and C12 connected in series between the output 33 and the inverting input terminal of amplifier 21. Across capacitor C12 is a series-connected pair of resistors R25 and R26. The resistance of R25 is preferably several times the value of R26, such as 5.1 megohms. Terminals 77 and 79 are provided for making a jumper connection across capacitors C9 and C10. Similarly, terminals 81 and 83 are provided to make a jumper connection across resistor R25. When terminals 77 and 79 are not jumpered, this feedback circuit acts as the so-called internal reset feedback circuit 35 of FIG. 1 to cause the signal at point 33 to vary not only as the algebraic sum of the voltage applied to the input terminals of amplifier 21 but also as a function of the time integral of this algebraic sum. This has the effect of causing the angular velocity of the driven member on load 13 to be maintained substantially equal to the preselected angular velocity with a very high order of accuracy, e.g., within 0.25 percent, by providing very high gain for static regulation and a lower gain at upper control band frequencies for stable operation. Thus, unlike prior art controls which required costly control modifications to provide such high accuracy, such precision control is achieved with the present control by merely removing a jumper connection. When the jumper is in place, speed regulation of the control is stably maintained within 0.5 percent.

The gain of amplifier 21 is varied by jumpering terminals 81 and 83. Thus the control gain may be decreased if desired by making a jumper connection between these terminals which has the effect of increasing the feedback for amplifier 21.

Other feedback circuits are interconnected with amplifier 21 as described in connection with FIG. 1. For this purpose, a feedback connection is provided by a lead L9 connected from the top of resistor R11, which is preferably of a low resistance, such a 1 ohm, so that the voltage across the resistance, varies as a function of the current in clutch winding 45. Current feedback circuit 27 of FIG. 1 includes a maximum current potentiometer R27 connected between lead L9 and ground and whose arm is connected through resistors R28–R30 to the noninverting input terminal of amplifier 21. Potentiometer R27 permits preselection of the maximum clutch winding current. A capacitor C13 is connected between the junction of resistors R29 and R30 and ground for ripple filtering. Terminals 85 and 87 are provided for making a jumper connection across resistor R28 for shorting the latter in order to increase the amount of current feedback when necessary.

Feedback circuit 29 of FIG. 1 is shown in FIG. 2A to constitute a damping adjustment potentiometer R32 connected between line L9 and ground and circuit elements including a capacitor C14, a resistor R33 and a capacitor C15 connected in series between the arm of this potentiometer and ground. A resistor R34 connects the junction of capacitor C15 and resistor R33 to the noninverting input terminal of amplifier 21. This circuit includes diodes D12 and D13 which are connected with opposite polarity, their cathodes being connected with opposite polarity, together, in a circuit between the junction of resistor R33 and capacitor C14 and ground. The interconnected cathodes of these two diodes are biased to the negative 15-volt supply through a resistor R35, as indicated. This feedback circuit acts as a so-called rate-current feedback circuit producing a degenerative feedback signal whose amplitude varies as a function of the rate of change in the current in clutch winding 45 and for this purpose constitutes a bandpass filtering circuit to AC couple a voltage proportional to the current in clutch winding 45 back to the control amplifier as this degenerative feedback signal.

The circuit values of capacitors C14 and C15 and resistors R33 and R34 are selected phosphorus-doped provide this filtering circuit with a transfer function defining a passband substantially encompassing the dynamic range of frequency response of the control. The so-called 3db points of this bandpass filter may be 0.6 and 2.8 Hz., for example, to provide a passband which encompasses the dynamic frequency range of the control, which may be of the order of from 0 to 1 Hz. The upper end of the passband is thus substantially below any AC power ripple frequency (such as 60 and 120 Hz.) and the lower end of the passband is then substantially above 0 frequency so that the DC gain of the control approaches 0. The dynamic stability of the control is greatly improved through the operation of this circuit without causing any degradation in the static gain or regulation which would otherwise occur if the lower end of the passband were substantially at 0 frequency. Adjustment of damping potentiometer R32 thus allows operational variation in the dynamic stabilization of the control without effecting static regulation and may be utilized to adjust the control for critical damping.

The diode circuit including diodes D12 and D13 serves to prevent the junction of resistor R33 and capacitor C14 from attaining ground potential so as to prevent the junction of resistor R33 and capacitor C14 from becoming positive in normal operation. This prevents any momentary overspeed or underspeed of the control which might otherwise occur due to an initially charged condition of capacitor C20 resulting from the actuation of relay contacts of the control.

In addition to the feedback signals delivered to the noninverting input terminal of amplifier 21, it may be noted that this terminal is also supplied with a bias voltage by means of a minimum bias potentiometer R36 connected between the negative and positive 15-volt supplies and whose arm is connected through a resistor R37 to the noninverting input terminal.

Phase limit circuit 37 of FIG. 1 is shown in FIG. 2A to constitute a current limit adjusting potentiometer R38 connected between lead L9 and ground. The arm of this potentiometer is connected through a resistor R39 to a transistor TR3 of this circuit whose emitter is grounded and whose collector is connected through a resistor R41 to the base of another transistor TR4. The collector-emitter terminals of the latter are connected in a circuit including a resistor R42 and a resistor R43 between the negative 15-volt supply and the output terminal 33 of control amplifier 21. A feedback circuit including a resistor R44 and a Miller-effect frequency rolloff capacitor C16 is connected between the respective collectors of transistors TR3 and TR4. Operation of this phase limit circuit is such that transistors TR3 and TR4 are normally nonconductive until the current in clutch winding 45 exceeds a preset limit determined by the setting of the arm of potentiometer R38, at which point transistor TR3 conducts, in turn causing transistor TR4 to become conductive and to thereby effectively clamp the output of the control amplifier 21 at a negative 15-volt level. Thus, if the current in the clutch winding incipiently exceeds the preset limit, the action of this circuit is such as to effectively terminate the triggering control signal.

VELOCITY REFERENCE INPUT AND VELOCITY FEEDBACK

In accordance with the modular concept of a control of this invention various circuits may be alternatively connected to serve as the means for producing a reference voltage proportional to a preselected angular velocity of the driven member or load 13, which means is indicated by the block 31 in FIG. 1. To provide the drive with simple potentiometer speed control, a potentiometer R45 is indicated which has one end connected to the positive 9.1 v. DC supply and the other end grounded. The wiper arm of this potentiometer is provided with a terminal 93. The potential at terminal 93 constitutes a variable reference voltage proportional to a preselected angular velocity of load 13. Various terminals such as those each designated 95 are preferably provided as spared terminals to facilitate jumper connections. Wiper terminal 93 may be jumper-connected by means of one of these auxiliary terminals 95 to terminal 71 to provide interconnection with the noninverting input terminal of amplifier 21.

If it is desired to provide the control with either logarithmic or linear acceleration, terminal 93 of this speed control potentiometer R45 may be connected to a logarithmic acceleration circuit indicated generally at 97 or to a linear acceleration circuit indicated at 99.

Logarithmic acceleration circuit 97 includes a rate-of-acceleration adjustment potentiometer R47 connected through a resistor R49 between terminals 101 and 102. The arm of R47 is connected to a capacitor C17, the other side of which is grounded at G. A diode D14 is connected between the arm of R47 and a terminal 103. The arm of R47 is also connected through a resistor R51 to a terminal 105. To provide logarithmic acceleration, terminal 93 of potentiometer R45 may be connected through one of terminals 95 to terminal 101 of this logarithmic acceleration circuit. Shown with this circuit are a normally open pair of contacts E5 controlled by relay E which are shown provided with a pair of terminals 107 and 109. Terminal 105 is jumpered to terminal 107 and terminal 109 is then jumpered to one of the ground terminals G. Terminal 102 is jumpered to terminal 69 to provide a signal input to the noninverting input terminal control amplifier 21. When thus connected, this circuit operates to cause charging of capacitor C17 at a rate determined by the arm setting of potentiometer R47 to provide a logarithmically increasing reference voltage to the control amplifier upon startup of the driven member 13. Thus, adjustment of potentiometer R47 may vary acceleration time from a period of 5 to 20 seconds, for example. This circuit also provides logarithmic deceleration (at a rate determined by the setting of potentiometer R47) upon reduction of the speed setting of potentiometer R45 by virtue of the discharge characteristic of capacitor C17. However, normal deceleration may be provided by making a jumper connection between terminals 101 and 103 to provide a discharge path through diode D14 during deceleration.

Linear acceleration circuit 99 includes a transistor TR5 whose collector-emitter terminals are connected in a circuit including a rate-of-acceleration adjustment potentiometer R53, a resistor R54, and a capacitor C19 between the positive 15-volt supply and ground. A constant bias voltage is applied to the base terminal of transistor TR5 by resistors R55 and R57 so as to provide a constant current charging circuit for capacitor C19. One side of capacitor C19 is connected through a diode D15 to a terminal 111 and also through a resistor R59, a diode D16 and a pair of normally closed contacts E6 controlled by relay E, to a terminal 113. This same side of capacitor C19 is connected to the base of a further transistor TR6 whose collector and emitter are connected in a circuit including a pair of resistors R60 and R61 between the 15-volt supply and ground. The emitter of transistor TR6 is provided with a terminal 115. To connect this linear acceleration circuit, terminal 93 of potentiometer R45 is jumper-connected, by means of one of terminals 95, to terminal 111. Terminal 113 is jumpered to one of the ground terminals G and terminal 115 is jumpered to one of the noninverting input terminals such as terminal 71. When thus connected, upon startup of the control, transistor TR5 charges capacitor C19 at a constant rate to provide a linearly increasing voltage across capacitor C19. Accordingly, a speed reference voltage is present at the emitter of transistor TR6 and which increases as a linear function of time, the rate of increase and thus rate of acceleration being determined by the setting of potentiometer R53 to provide a predetermined acceleration time of 7 to 100 seconds, for example. Closing of contacts E6 causes immediate discharge of capacitor Cl 9 upon stopping the control.

A control of this invention may also be used in a tachometer follower mode of operation. For this purpose, a tachometer follower circuit indicated at 117 is provided. This circuit includes a diode full-wave rectifier bridge 119 including diodes D17–D20 across which a tachometer generator, shown in outline at 121, may be connected by means of a pair of terminals 123 and 125. This tachometer generator may be driven by an external or remote rotating load whose speed is governed by a control similar to that of the present invention. The rectified output of the bridge is supplied through a resistor R62 across a capacitor C21. Across the latter is connected a ratio adjustment potentiometer R63 whose wiper arm is provided with a terminal 127. One side of the potentiometer R63 is grounded and the other side is provided with a terminal 129. To connect this circuit, a jumper connection is made between terminal 127 and a noninverting input terminal 71. When so connected, the voltage on the arm of potentiometer R63 constitutes a reference voltage proportional to a preselected angular velocity of the driven member of load 13. Operation of the control is then such that the angular velocity of load 13 follows that of the remote load which drives tachometer generator 121.

Velocity feedback circuit 25 is shown in FIG. 2A to comprise a transformer T4 including a primary winding T4P having terminals 130 and 131 which permit connection across this winding of an AC tachometer generator TAC driven with load 13. The output voltage of this generator is directly proportional to the angular velocity of load 13. The secondary winding T4S of the transformer is connected across a full-wave diode rectifier bridge 133 including diodes D22–D25. The output of this bridge is supplied through a resistor R64 across a capacitor C22 across which is connected a maximum speed adjusting potentiometer R65 whose arm is provided with a terminal 135. The lower side of the potentiometer is grounded. Together, components R64, C22 and R65 act as a low-pass filter to attenuate tachometer ripple frequencies. This circuit is also provided with a pair of terminals 137 and 139 for connection of a DC tachometer generator, if desired. This circuit is connected to provide a degenerative feedback signal whose amplitude varies as a function of the instantaneous angular velocity of load 13 by making a jumper connection between terminal 135 and noninverting input terminal 61.

It should be noted that the control may be operated under a clutch winding current control mode by not connecting this tachometer generator circuit 25 but rather allowing the current feedback circuit to supply the necessary feedback for maintaining the speed of the driven member. In this current control mode of operation, jumper connections are made between terminals 53 and 55 and the adjacent ground terminals G. The arm of potentiometer R45 is connected by means of the auxiliary terminals 96 to noninverting input terminal 7, as described previously.

PULSE GENERATOR

The pulse generator circuitry 19 of FIG. 1 is shown in block diagrammatic form in FIG. 3 and is outlined in dashed line in FIG. 2B. Referring to FIGS. 2B and 3, the pulse generator circuitry is supplied with the above-described triggering control signal by a lead 11 through a resistor R66. Another lead L12 supplies a synchronization signal by interconnection with rectifier bridge 38. This so-called sync signal, which is constituted by the pulsating DC output voltage of bridge 38 and whose waveform is shown in FIG. 4A, is supplied through a resistor R67. The triggering control signal determines the point in the AC half cycle at which the SCR's are fired or triggered, while the sync signal synchronizes the output pulses, which are delivered by pulse amplifier 17 to the SCR's, with the anode voltage of the SCR's. An input voltage comparator 141 in FIG. 3 is seen in FIG. 2B to be constituted by a pair of logic gates 143 and 145. The output of gate 145 is connected to a positive potential through a resistor R68 for a purpose explained later. Across the input of gate 143 is a regulating circuit including a Zener diode Z5.

Input comparator 141 "squares up" the sync signal to deliver an output signal whose voltage characteristic is shown in FIG. 4B and which is constituted by a negative-going pulse each time the AC power voltage is 0-valued. This signal is supplied to a further logic gate 147 which inverts and buffers this signal and delivers it to the base of a transistor TR7. The resultant voltage across a load resistor R69 in the collector-emitter circuit of TR7 is supplied across a capacitor C23. The latter is part of an RC circuit including a resistor R71 connected to the positive 15-volt supply to cause charging of capacitor C10. Transistor TR7 and this RC network together make up a ramp generator designated 147 in FIG. 3. The periodic conduction of transistor TR7 caused by the signal shown in FIG. 4B acts to alternately charge and discharge capacitor C23. Transistor TR8 acts as an emitter follower to supply across an emitter resistor R72 a signal having a voltage characteristic shown in FIG. 4C. This signal is delivered through a further resistor R73 to a second voltage comparator 147 constituted by another pair of logic gates 151 and 153. A resistor R74 is connected between the input of gate 151 and the output of gate 153 to provide a degree of hysteresis in the switching action of this comparator. Also supplied to the input of voltage comparator 149 via resistor R66 is the triggering control signal. Added to this triggering control signal is a bias voltage appearing on the arm of a bias adjustment potentiometer R75 connected between the negative and positive 15-volt supplies. This bias voltage is applied through a resistor R76 to the input of gate 151. Voltage comparator 149 in effect sums the ramp voltage (FIG. 4C) across capacitor C23 delivered by ramp generator 147 and the described DC levels supplied to the input of gate 151 and trips to provide a pulse voltage characteristic shown in FIG. 4D at a trip point in the AC half cycle when the sum of these voltages reaches a preset level. As the DC level increases, comparator 149 trips earlier in the AC half cycle and vice versa. Voltage comparator 149 thereby provides pulses at a variable phase angle of the AC supply voltage. The output of comparator 149 is shown in FIG. 4D wherein a dotted line indicated at 158 signifies the leading edge of the shifted pulse output of the comparator as the input voltage level is decreased, such a decreased level being indicated at 160 in FIG. 4C.

The output of comparator 149 is delivered to one input of a two-input logic AND-gate 157 which, when gated by a signal supplied to the other input thereof, delivers the pulsed output signal shown in FIG. 4D to a one-shot multivibrator 159. The latter is shown in FIG. 2B to be constituted by a pair of logic AND-gates 161 and 163. This one-shot multivibrator supplies a pulsed output signal represented in FIG. 4E which constitutes a movable firing pulse, i.e., a firing pulse at varying phase angles of the AC power. This output signal is supplied to one input of a two-input logic OR-gate 165 which delivers an output signal via lead L7 to the base of transistor TR2 of the pulse amplifier circuitry.

Each time transistor TR7 conducts, discharging capacitor C23, a capacitor C24 delivers a pulse thereby to provide a signal whose voltage characteristic is shown in FIG. 4F. This signal is dropped across a resistor R78 to provide an input signal to one input of a two-input logic AND-gate 176. The other input to this AND gate is supplied by a blocking single-shot or so-called one-shot multivibrator 169 which is constituted (see FIG. 2B) by logic gate 143 and a further logic gate 171 coupled thereto by a capacitor C25. A resistor R70 between the input of gate 171 and ground holds the input at ground until a pulse is received, and thus the purpose of resistor R68 is to provide drive to capacitor C25 because of the shunting effect of resistor R70.

Multivibrator 169 supplies a narrow pulse, e.g., on the order of 50 microseconds, each time the sync signal (FIG. $A) is at ground potential. The waveform of the output of multivibrator 169 is shown in FIG. 4G. As a result, the signal (FIG. 4F) delivered by capacitor C24 is not gated by AND-gate 167 unless this signal is "high" for a period longer than the 50 microsecond pulse supplied by multivibrator 169. This eliminates the possibility that any discharge pulse caused by "noise" on the AC power lines will not be delivered as a pulse by AND-gate 167. This arrangement thus acts as a digital filter providing means for inhibiting delivery of any discharge pulse when less than a predetermined duration such as the 50 microseconds. In other words, AND-gate 167 and multivibrator 169 allow the discharge pulse to be delivered only if it is greater than the duration noted, i.e., 50 microseconds. The output of AND-gate 167 is delivered as the other input to OR-gate 165 and has a voltage characteristic shown in FIG. 4H.

The pulse generator circuitry includes means for supplying a string of triggering pulses to the SCR's to cause rapid repetitive triggering thereof within each half-cycle of AC power waveform following each initial triggering pulse occurring at the variable phase angle of the AC power. This ensures SCR latching. This means for supplying a string of triggering pulses includes an oscillator 170 and a two-input AND-gate 172. The output of the oscillator, whose frequency may be about 1 kHz. is provided as one input to gate 172 and the other input thereto is provided by the output of logic gate 161 (which, as seen in FIG. 2B, supplies the output of gate 157). The output terminal of gate 172 is interconnected with the output terminal of gate 167 to provide a "wired" OR-gate 174 providing an input to gate 167.

Oscillator 170 is seen in FIG. 2B to be constituted by a conventional type including a unijunction transistor TR8 and a capacitor C28 connected between the emitter of TR8 and ground which is charged from the positive 15-volt supply potential through a resistor R77. Transistor TR8 periodically becomes conductive at a voltage to which capacitor C28 is charged which is determined by the intrinsic standoff ratio of transistor TR8, thereby discharging capacitor C28 and supplying an output pulse to one input of gate 172. As a result, the output of OR-gate 165 has a voltage characteristic shown in FIG. 4S.

The composite output signal characteristic of FIG. 4J is seen to comprise a series of initial triggering pulses 173 whose phase angle in relation to the AC power line voltage varies in accordance with the level of the triggering control signal to cause triggering of the SCR's at varying phase angles of the AC power and thereby to control the level of current in clutch winding 45 so as to drive load 13 substantially at the preselected angular velocity determined by potentiometer R45. It may be seen that as the triggering control signal increases in value as shown in FIG. 4C, the triggering control pulses will be delivered later in the AC power voltage half-cycle. Such pulses are shown in dashed line and designated 175. Following each initial triggering pulse 173 is a string of pulses 176 which are provided for the duration of each half-cycle of the AC power waveform. Because the string of pulses is supplied over the desired firing phase angle (which varies), there will be adequate SCR anode voltage and sufficient latching current to ensure reliable triggering of the SCR's. The composite pulse signal also includes relativity narrow pulses such as those shown at 177 which are at constant phase angles and occur substantially at the end of each half-cycle of the AC power voltage. These latter pulses are "inverting" pulses which are provided for causing conduction of the SCR's when the AC power voltage and the voltage across the winding are inverted so that the current in the winding will rapidly decay when energization thereof is rapidly reduced, as is explained later.

Preferably, each of the logic gates of this pulse generator circuitry is of the monolithic integrated circuit variety widely commercially available.

As those skilled in the art are aware, logic gates of the type described may be replaced with their logical equivalents. E.g., an AND gate may be replaced by a NAND gate together with an inverter, and so forth. Also, while reference has, for the sake of illustration, been made in FIG. 4 to various AND-gates, these gates are, in reality logic NAND-gate (as may be seen in FIG. 2B) in order to satisfy input-output level requirements imposed in using such logic gates.

FUNCTIONAL CONNECTIONS AND OPERATION

For operation of the control, appropriate jumper connections are made so as to connect the various circuit modules or components to provide the mode of control desired. For example, if it is desired that the control operate in a tachometer feedback mode, the tachometer velocity feedback circuit, including a tachometer generator, is connected as described hereinabove. The speed control potentiometer, when it is used, may be connected with the logarithmic acceleration circuit 97 or linear acceleration circuit 99 in the manner previously described to cause the load to be accelerated either logarithmically or linearly with respect to time upon startup of the load. Alternatively, the control may be operated in a current control mode wherein the torque applied to the load is maintained constant for a given slip speed in response to the current in clutch winding 45. For this purpose, the following jumper connections may be made:

Terminals
85–87
49–G
59–G
79–77
83–81

In any case, to effect startup of the load and operation of the control, start pushbutton switch PB2 is operated. This energizes the winding of relay E. Contacts E1 of this relay close to set up a latching circuit for the relay winding. Contacts E2 close to complete a circuit through the anode-cathode circuits of SCR1 and SCR2 and clutch winding 45. Contacts E3 open to disconnect brake winding 47 and contacts E4 open to disconnect the shunting connection across clutch winding 45 through diode D11. Contacts E5 and E6 associated with the logarithmic acceleration circuit 97 and linear acceleration circuit 99, respectively, are also operated (either of these two circuits being jumper-connected if desired). Thus, voltage which increases as a function of the setting of the respective potentiometer R47 or R53 is applied to the noninverting input terminal of amplifier 21. This voltage increases to the maximum value determined by the arm setting of speed potentiometer R45. Accordingly, an increasing triggering control signal is supplied to pulse generator 19 which therefore supplies pulses as described above which are movable, i.e., are at varying phase angles in response to this triggering control signal. Pulses which occur at a constant phase angle, i.e., so-called inversion pulses, are also provided as previously described. The triggering control signal varies according to the algebraic sum of the reference voltage supplied by the appropriate logarithmic or linear acceleration circuit 97 or 99 and the various feedback signals such as the winding current feedback, the rate-current feedback, and the tachometer feedback which varies according to the instantaneous angular velocity of the driven member or load 13. The control thus operates to maintain the angular velocity of this driven member substantially at the preselected angular velocity determined by the arm setting of potentiometer R45.

It will be noted that because clutch winding 45 presents an inductive load in the anode-cathode circuit of each of the SCR's, the voltage across the clutch winding 45 will be negative during a portion of that period during which each SCR is conductive. Accordingly, even when the applied sinusoidal AC power voltage is 0-valued, energy inductively stored in clutch coil 45 causes the voltage thereacross to have a negative component. The coil voltage thus follows a sinusoidal waveform from a positive value to a negative value until the next SCR is turned on, it being apparent that the SCR's are triggered in alternate sequence by virtue of the connection of their cathode terminals to opposite sides of the AC power line. It is important to observe that when the triggering control signal supplied by amplifier 21 is reduced and the movable firing pulses are thus "phased back" to a 0 firing angle with respect to the end of each half-cycle of the AC power voltage, the voltage across clutch coil 45 will remain mostly negative in character due to the inductance of this coil. Even though the variable phase angle pulses or so-called movable pulses are "phased back," the inverting pulses supplied by pulse generator 19 insure that each of the SCR's will continue to conduct even while the AC power voltage and the voltage across clutch winding 45 are negative, i.e., may be said to be inverted. Conduction of the SCR's during this negative voltage period provides a fast decay of energy from clutch winding 45. In effect, this energy is "pumped" back into the powerlines. This results in an inversion of the stored energy in the coil to produce a fast decay in the current in the clutch winding. Thus, the clutch winding current decays rapidly when energization of the winding is rapidly reduced. Accordingly, the response of the control is very quick in reducing the angular velocity of load 13.

During operation of the control, the phase omit circuit 37 performs an important function in limiting the current in clutch winding 45 to a maximum safe level. This permits so-called forcing of the clutch winding by allowing a voltage higher than the rated voltage of this winding to be used for the energization thereof. Greatly improved control response is provided by forcing, since the application of greater than rated voltages induces a current in the winding in a shorter time, thereby to more quickly couple energy from the motor or other power source to the driven member or load 13. To operate the control in this forcing mode, the control may be connected to provide an AC power voltage across the power circuit including clutch winding 45 of, for example, twice the voltage for which the clutch winding is rated. E.g., 90 volts may be applied across a clutch winding rated at 45 volts to provide two-times field forcing.

The phase limit circuit acts to limit the phase of triggering through its interconnection with the pulse generator circuitry 19 by causing the movable or variable phase angle pulses to be phased back whenever the voltage fed back by lead L9 across potentiometer R38 produces a voltage at the arm of this potentiometer which incipiently exceeds the threshold voltage of transistor TR3 of this circuitry. When transistor TR3 becomes conductive, transistor TR4 is caused to conduct, providing a negative voltage through resistor R42 to the input lead L11 to the pulse generator circuitry. The variable phase angle pulses delivered by the pulse generator circuitry are thereby phased back to limit clutch winding current to the point at which the voltage at the arm of potentiometer R38 exceeds the threshold voltage of transistor TR3. Thus the winding current is prevented from substantially exceeding a preset value. Adjusting the setting of the arm of potentiometer R38 thus allows the current limit point off the control to be preselected.

It may be noted that resistor R44 of this circuit provides a measure of positive feedback from a collector of transistor TR4 to the base of transistor TR3. This causes the phase limit circuit to exhibit a slight hysteresis about the trip point determined by the threshold level of transistor TR3. Resistor R39 provides an input voltage to this circuit having a certain amount of AC ripple, thus causing the circuit to operate in a pulse-width modulation mode about the trip point so that the circuit operates more in the nature of a linear amplifier than a high-main switch, thereby to stabilize the closed-loop current limit mode of operation. Capacitor C16 is also helpful in causing the control to exhibit frequency response rolloff with increasing frequency, as is desired.

To effect stopping of the load, stop pushbutton PB1 is operated. This deenergizes the winding of relay E, causing contacts E1 and E2 thereof to open. Contacts E3 are closed by the deenergization of relay E, as also are contacts E4. The opening of contacts E2 deenergizes clutch winding 45 and the closing of contacts E3 energizes brake winding 47 to cause load 13 to be braked to a stop. As noted previously, contacts E4 are adapted to close just prior to the opening of contacts E2 when relay E is deenergized. Accordingly, a path to ground is provided through contacts E4 and diode D11 which effectively shunts clutch winding 45 to ground to dissipate energy which is inductively stored in the clutch winding. As a result, when contacts E2 then open, substantially no current is flowing through these contacts which would otherwise cause arcing and erosion thereof.

The present control may be operated to control a payoff or takeup drive member for maintaining substantially constant tension in a moving length of material. Such a use of the control is representatively illustrated in FIG. 5 wherein a controlled-velocity drive with which the present control is utilized is designated 179 and the payoff or takeup member is designated 181, drive 179 being illustrated as controlling the angular velocity of drive member 181 to maintain a substantially constant tension in a moving length of material 183, such as a web of paper moving through a printing press. A length 185 of the moving web is looped around a dancer roller 187 having a weight W to provide a tension loop for causing a tension of W/2 in the moving material. Any change in the tension will change the length of loop 185 to vary the vertical position of roller 187. Thus, as tension increases, becoming greater than W/2, loop 185 shortens. On the other hand, if tension decreases, becoming less than W/2, loop 185 lengthens. A dancer potentiometer R79 is associated with dancer roller 187, the position of the wiper arm of this potentiometer being determined by the position of roller 187. The wiper thereby delivers a dancer position signal (i.e., a loop length signal) which varies according to the length of loop 185. One side of potentiometer R79 is connected as indicated to a constant reference voltage, such as the positive 9.1 volts DC power supply potential and the other side is grounded. The wiper arm is provided with a terminal 189 so that the wiper arm may be jumper-connected to other circuitry of the control.

Referring now to FIG. 2A, the circuit board of the control is provided with a further potentiometer R81 having terminals 191 and 193 at opposite ends thereof, the wiper arm of this potentiometer being connected through a capacitor C27 to a further terminal 195. To connect the control to permit control of a payoff or takeup drive, the following jumper connections are made:

Terminals
189–191
191–59
195–73
193–G
65–G
67–G
71–95
93–95
53–G
55–G
77–79

From the foregoing it may be seen that the signal provided by the wiper arm of potentiometer R79 is delivered across potentiometer R81. The wiper arm of the latter is connected through capacitor C27 to the inverting input terminal of amplifier 21. Potentiometer R81 thus serves as a velocity damping control and together with capacitor C27 provides means for differentiating the loop length signal delivered by the wiper arm of potentiometer R79 to provide a degenerative dancer feedback signal having an amplitude which varies as a function of the instantaneous dancer velocity, i.e., the rate of change of said loop length. Potentiometer R45 serves to produce a reference voltage proportional to a preselected dancer position or, in other words, one which is proportional to a preselected loop length. Triggering of the SCR's is therefore effected so as to control the speed of drive member 181 for maintaining the loop substantially at said preselected length thereby to maintain a substantially constant tension of W/2 in the moving material.

A control of the present invention may also be utilized for controlling the speed of a driven member through energization of not only a clutch winding but also though selective alternate energization of both a clutch winding and a brake winding. Although the control has been described herein and illustrated as selectively controlling the energization of solely a clutch winding (with the brake winding being energized only to effect stopping of the load), it is fully adaptable to being used in a control installation using two of the controls as herein described for alternate brake and clutch energization. In this event, one of the present controls is then utilized to control energization of a clutch and the other to control energization of a brake winding.

For this alternate energization mode, only a single tachometer generator feedback circuit 25 is employed. The output terminal 135 of feedback circuit 25 is, in this control application, connected to a noninverting input terminal 61 of the amplifier 21 of that control which controls energization of the clutch winding and is connected to an inverting input such as input terminal 49 of the brake winding control. In a similar manner, speed control potentiometer R45 provides a speed reference signal to both of the controls. For that purpose terminal 93 is jumper-connected to terminal 71 to provide a noninverted input of the clutch winding control and is jumper-connected to a terminal such as 59 of the brake winding control.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A control for a controlled-velocity drive having a driven member and an electromagnetic coupling having a winding the energization of which controls the angular velocity of the driven member, the control comprising:
   a triggerable semiconductor current switching device adapted to be connected between a source of AC power and the winding for controlling the energization thereof;
   a first feedback circuit for producing a first degenerative feedback signal having an amplitude which varies as a function of the instantaneous angular velocity of the driven member;
   a second feedback circuit for producing a second degenerative feedback signal having an amplitude which varies as a function of the current in the winding;
   a third feedback circuit for producing a third degenerative feedback signal having an amplitude which varies as a function of the rate of change of the current in the winding;
   means for producing a reference voltage proportional to a preselected angular velocity of the driven member; and
   means responsive to the reference voltage and to the three feedback signals for causing triggering of the current switching device at varying phase angles of the AC power to drive the driven member substantially at said preselected angular velocity and for also causing triggering of the switching device at a substantially constant phase angle of the AC power to cause conduction of the switching device when the AC power voltage and the voltage across the winding are inverted whereby current in the winding rapidly decays when energization thereof is rapidly reduced.

2. A control as set forth in claim 1 further comprising means, interconnected with the first feedback circuit and with the means for causing triggering of the switching device, for limiting the varying phase angle of triggering of the switching device when the winding current incipiently exceeds a preset value thereby to substantially prevent the winding current from exceeding said preset value.

3. A control as set forth in claim 1 wherein the means for causing triggering of the switching device includes means for algebraically summing the reference voltage and the three feedback signals and for producing a triggering control signal varying as a proportional function of the algebraic sum.

4. A control as set forth in claim 3 further comprising feedback means, adapted to be interconnected with the summing means, for causing the triggering control signal to vary also as a function of the time integral of the algebraic sum whereby the angular velocity of the drive member is maintained substantially equal to said preselected angular velocity with a high order of accuracy.

5. A control as set forth in claim 4 wherein the summing means is constituted by a differential operational amplifier and the feedback means includes a capacitive circuit adapted to be interconnected between the output terminal and one of the input terminals of the differential amplifier.

6. A control as set forth in claim 1 further comprising circuit means, adapted to be interconnected with the means for producing a reference voltage, for causing the reference voltage to increase as a logarithmic function of time upon startup of the driven member.

7. A control as set forth in claim 1 further comprising circuit means, adapted to be interconnected with the means for producing a reference voltage, for causing the reference voltage to increase as a linear function of time upon startup of the driven member.

8. A control as set forth in claim 1 wherein the means for producing a reference voltage comprises tachometer follower circuitry adapted to be connected with the means for causing triggering and with an external tachometer generator thereby to produce a signal which varies as a reference voltage proportional to the instantaneous angular velocity of the external tachometer generator whereby the angular velocity of the driven member follows the angular velocity of the driven member.

9. A control as set forth in claim 1 wherein said third feedback circuit includes a band-pass filtering circuit for AC coupling a voltage proportional to the current in said winding to provide said third feedback signal, said filtering circuit having a passband substantially encompassing the dynamic range of frequency response of the control.

10. A control as set forth in claim 9 wherein the upper end of said passband is substantially below any AC power ripple frequency and the lower end of said passband is substantially above 0 frequency.

11. A control as set forth in claim 1 wherein said first feedback circuit comprises an AC tachometer generator driven by said driven member and means for rectifying the AC output of the tachometer generator thereby to provide said first feedback signal.

12. A control as set forth in claim 1 wherein said means responsive to the reference voltage and to the three feedback signals comprises an operational amplifier providing a triggering control signal varying according to the algebraic sum of the reference voltage and the three feedback signals, a pulse generator circuit providing pulses at said varying phase angles in response to the triggering control signal, said pulse generator also providing pulses at said constant phase angle, and means, including a pulse amplifier, for supplying said pulses of varying and constant phase angles to said switching device.

13. A control as set forth in claim 12 further comprising a switching circuit interconnected with said operational amplifier and said first feedback circuit and operative to limit the value of said triggering control signal and thereby to limit the varying phase angle of triggering of the switching device, when the winding current incipiently exceeds a preset value thereby to prevent the winding current from substantially exceeding said preset value.

14. A control as set forth in claim 12 wherein said pulse generator circuit comprises a first voltage comparator operative to supply a pulse each time the AC power voltage if 0-valued, a ramp generator including a capacitor, means for charging the capacitor, means controlled by pulses from the first voltage comparator for periodically discharging the capacitor to provide a periodic ramp voltage characteristic in synchronism with the AC power, a second voltage comparator for summing the voltage of said triggering control signal with the voltage across said capacitor and operative to supply an output pulse at a preset sum thereby to provide pulses at said variable phase angle, and circuit means interconnected with the ramp generator and responsive to discharge of the capacitor to provide a pulse upon said discharge which discharge pulse is thereby at said constant phase angle.

15. A control as set forth in claim 14 wherein said pulse generator circuit includes means for inhibiting delivery of said discharge pulse when less than a predetermined duration, thereby to prevent delivery of any discharge pulse caused by AC power source noise.

16. A control as set forth in claim 15 wherein the inhibiting means comprises a logic gate for controlling delivery of said discharge pulse, and a further switching circuit interconnected with the first voltage comparator for controlling said gate to inhibit delivery of the discharge pulse for said predetermined duration, whereby the discharge pulse is delivered only when greater than said predetermined duration.

17. A control as set forth in claim 12 wherein said pulse generator further comprises means for supplying a string of pulses for causing rapid repetitive triggering of said switching device following each of said pulses of varying phase angle thereby to ensure latching of said switching device.

18. A control as set forth in claim 17 wherein said means for supplying a string of pulses comprises an oscillator whose frequency is substantially greater than the frequency of the AC power source.

19. A control for a controlled-velocity drive having a driven member and an electromagnetic coupling having a winding, the energization of which controls the angular velocity of the driven member, the control comprising:
- a triggerable semiconductor current switching device adapted to be connected between a source of AC power and the winding for controlling the energization thereof;
- a first feedback circuit including a tachometer generator for producing a first degenerative feedback signal having an amplitude which varies as a function of the instantaneous angular velocity of the driven member;
- a second feedback circuit for producing a second degenerative feedback signal having an amplitude which varies as a function of the current in the winding;
- a third feedback circuit for producing a third degenerative feedback signal having an amplitude which varies as a function of the rate of change of the current in the winding;
- means for producing a reference voltage proportional to a preselected angular velocity of the driven member;
- means for algebraically summing the reference voltage and the three feedback signals and for producing a triggering control signal varying as a proportional function of the algebraic sum, including internal feedback circuitry adapted to be connected for causing the triggering control signal to vary also as a function of the time integral of the algebraic sum whereby the angular velocity of the driven member is maintained substantially equal to said preselected angular velocity with a high order of accuracy; and
- triggering means responsive to the triggering control signal for triggering the switching device at phase angles of the AC power varying in accordance with the triggering control signal to drive the driven member substantially at said preselected angular velocity, the triggering means being also operative for triggering the switching device at a substantially constant phase angle of the AC power to cause conduction of the switching device when the AC power and the voltage across the winding are inverted whereby current in the winding rapidly decays upon rapid reduction of energization thereof.

20. A control for a controlled-velocity drive having a between which controls the tension in a moving length of material, an electromagnetic coupling having a winding the energization of which controls the angular velocity of the drive member, said material including a tension loop the length of which changes in response to change in the tension of said material, the control comprising:
- a triggerable semiconductor current switching device adapted to be connected between a source of AC power and the winding for controlling the energization thereof;
- a first feedback circuit, including means responsive to the loop length, for producing a loop length signal having an amplitude which varies as a function of said loop length, and means for differentiating said loop length signal to provide a first degenerative feedback signal which varies as a function of the rate of change of said loop length;
- a second feedback circuit for producing a second degenerative feedback signal having an amplitude which varies as a function of the current in the winding;
- a third feedback circuit for producing a third degenerative feedback signal having an amplitude which varies as a function of the rate of change of the current in the winding;
- means for producing a reference voltage proportional to a preselected loop length; and
- means responsive to the reference voltage and to the three feedback signals for causing triggering of the current switching device at varying phase angles of the AC power to drive the drive member for maintaining the loop substantially at said preselected length thereby to maintain substantially constant tension in said moving material and for also causing triggering of the switching device at a substantially constant phase angle of the AC power to cause conduction of the switching device when the AC power voltage and the voltage across the winding are inverted whereby current in the winding rapidly decays when energization thereof is rapidly reduced.

* * * * *

PO-1050
(5/69)

UNITED STATES PATENT OFFICE
CERTIFICATE OF CORRECTION

Patent No. 3,629,633     Dated December 21, 1971

Inventor(s) Gerald F. O'Callaghan

It is certified that error appears in the above-identified patent and that said Letters Patent are hereby corrected as shown below:

Column 3, line 59, "230 v. AC is supplied by an ampul of leads" should read -- 230 v.a.c. is supplied by a pair of leads --; column 3, line 67, "fuse E2." should read -- fuse F2. --. Column 4, line 41, "The useful of" should read -- The cathodes of --; column 4, lines 45-47, "The anodes of these SCR' crystal, are connected in common to lateral side of a set of normally open contacts E2 of relay E." should read -- The anodes of these SCR's are connected in common to one side of a set of normally open contacts E2 of relay E. --. Column 6, lines 46-47, "connected with opposite polarity, together" should read -- connected together --; column 6, line 59, "selected phosphorus-doped provide" should read -- selected to provide --. Column 8, line 72, "of load" should read -- or load --. Column 9, line 30, "terminals 96" should read -- terminals 95 --. Column 10, line 37, "gate 176." should read -- gate 167. --; column 10, line 47, "(Fig. $A)" should read -- (Fig. 4A) --. Column 11, line 13, "Fig. 45." should read -- Fig. 4J. --. Column 12, line 68, "omit" should read -- limit --. Column 13, line 37, "high-main" should read -- high-gain --. Column 15, line 55, "drive member" should read -- driven member --. Column 18, line 6, "between which" should read -- drive member which --.

Signed and sealed this 30th day of May 1972.

(SEAL)
Attest:

EDWARD M. FLETCHER, JR.
Attesting Officer

ROBERT GOTTSCHALK
Commissioner of Patents